US012092051B2

(12) United States Patent
Takeshima

(10) Patent No.: US 12,092,051 B2
(45) Date of Patent: Sep. 17, 2024

(54) AIR-FUEL RATIO CONTROL APPARATUS FOR INTERNAL COMBUSTION ENGINE AND AIR-FUEL RATIO CONTROL METHOD THEREFOR

(71) Applicant: TOYOTA JIDOSHA KABUSHIKI KAISHA, Toyota (JP)

(72) Inventor: Shinichi Takeshima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/466,593

(22) Filed: Sep. 13, 2023

(65) Prior Publication Data

US 2024/0183323 A1 Jun. 6, 2024

(30) Foreign Application Priority Data

Dec. 2, 2022 (JP) ................................ 2022-193525

(51) Int. Cl.
*F02D 41/14* (2006.01)

(52) U.S. Cl.
CPC ..... *F02D 41/1475* (2013.01); *F02D 41/1454* (2013.01); *F02D 41/1459* (2013.01); *F02D 2200/0802* (2013.01); *F02D 2200/0814* (2013.01)

(58) Field of Classification Search
CPC .. F02D 41/14; F02D 41/1454; F02D 41/1475; F02D 2200/0802; F02D 2200/0814
See application file for complete search history.

(56) References Cited

U.S. PATENT DOCUMENTS

2010/0242934 A1 9/2010 Yonekawa et al.
2011/0072784 A1* 3/2011 Hepburn ................ F01N 3/101 60/285
2011/0072787 A1* 3/2011 Hubbard ............ F02D 41/1454 123/703
2011/0308235 A1* 12/2011 Bisaiji ................ F02D 41/1465 60/301
2020/0132007 A1* 4/2020 Genko ............... F02D 41/1475
2020/0217264 A1* 7/2020 Inoshita ............. F02D 41/2461

FOREIGN PATENT DOCUMENTS

JP 2006-112300 A 4/2006
JP 2010-090880 A 4/2010
JP 2010-236450 A 10/2010

* cited by examiner

*Primary Examiner* — Logan M Kraft
*Assistant Examiner* — Johnny H Hoang
(74) *Attorney, Agent, or Firm* — Oliff PLC

(57) ABSTRACT

An air-fuel ratio control apparatus includes an air-fuel ratio control unit controlling an air-fuel ratio of exhaust gas flowing into an exhaust gas control catalyst of the internal combustion engine includes an air-fuel ratio control unit controlling the air-fuel ratio of the exhaust gas flowing into the exhaust gas control catalyst. The air-fuel ratio control unit alternately repeats a rich process for controlling the air-fuel ratio that is richer than a stoichiometric air-fuel ratio and a lean process for controlling the air-fuel ratio hat is leaner than the stoichiometric air-fuel ratio. The air-fuel ratio control unit, during the rich process, executes a lean pulse process for controlling, over a period shorter than a period of one execution of the lean process, the air-fuel ratio of the exhaust gas to reach a lean air-fuel ratio having a higher lean level than the air-fuel ratio during the lean process.

10 Claims, 9 Drawing Sheets

AIR-FUEL RATIO CONTROL APPARATUS FOR INTERNAL COMBUSTION ENGINE AND AIR-FUEL RATIO CONTROL METHOD THEREFOR

CROSS-REFERENCE TO RELATED APPLICATION

This application claims priority to Japanese Patent Application No. 2022-193525 filed on Dec. 2, 2022, incorporated herein by reference in its entirety.

BACKGROUND

1. Technical Field

The present disclosure relates to an air-fuel ratio control apparatus.

2. Description of Related Art

Hitherto, it is known that a three-way catalyst is provided in an exhaust passage for an internal combustion engine and the air-fuel ratio of exhaust gas flowing into the three-way catalyst is controlled (Japanese Unexamined Patent Application Publication Nos. 2010-090880 (JP 2010-090880 A), 2010-236450 (JP 2010-236450 A), and 2006-112300 (JP 2006-112300 A)). Particularly in the apparatus described in JP 2010-090880 A, the air-fuel ratio of the exhaust gas flowing into the three-way catalyst is varied between a lean air-fuel ratio and a rich air-fuel ratio, and is controlled so that the average air-fuel ratio varied in this way reaches a stoichiometric air-fuel ratio. JP 2006-112300 A discloses that secondary air is introduced into an exhaust port to make the exhaust gas into an oxygen-excess atmosphere, thereby reducing deterioration of an exhaust gas control catalyst along with carbon deposition.

SUMMARY

If there is a period during which the air-fuel ratio of the exhaust gas flowing into the exhaust gas control catalyst at a high temperature is set to the rich air-fuel ratio, carbon or a substance containing carbon, such as hydrocarbon (hereinafter referred to as "carbon-containing substance"), may be deposited on an oxygen storage agent of the exhaust gas control catalyst during this period. When such a carbon-containing substance is deposited on the surface of the oxygen storage agent and covers the surface widely, oxygen is not stored in the oxygen storage agent. As a result, the control performance of the exhaust gas control catalyst decreases.

As described above, JP 2006-112300 A discloses that the secondary air is introduced into the exhaust port to make the exhaust gas into the oxygen-excess atmosphere, thereby reducing the deterioration of the exhaust gas control catalyst along with the carbon deposition. If carbon deposited on the surface of the oxygen storage agent can be used to reduce NOx, the amount of hydrocarbon (that is, the amount of fuel) required to reduce NOx can be reduced accordingly. When the secondary air is introduced to make the exhaust gas into the oxygen-excess atmosphere, however, deposited carbon is not used for the reduction reaction of NOx, thereby causing a decrease in fuel efficiency.

In view of the above, the present disclosure presents an air-fuel ratio control apparatus for an internal combustion engine and an air-fuel ratio control method for the internal combustion engine that suppress a decrease in the oxygen storage capacity of an oxygen storage agent while suppressing a decrease in fuel efficiency.

A first aspect of the present disclosure relates to an air-fuel ratio control apparatus configured to control an air-fuel ratio of exhaust gas flowing into an exhaust gas control catalyst provided in an exhaust passage of an internal combustion engine and having an oxygen storage capacity. The air-fuel ratio control apparatus includes an air-fuel ratio control unit configured to control the air-fuel ratio of the exhaust gas flowing into the exhaust gas control catalyst. The air-fuel ratio control unit is configured to alternately repeat a rich process for controlling the air-fuel ratio of the exhaust gas flowing into the exhaust gas control catalyst to reach a rich air-fuel ratio that is richer than a stoichiometric air-fuel ratio and a lean process for controlling the air-fuel ratio of the exhaust gas flowing into the exhaust gas control catalyst to reach a lean air-fuel ratio that is leaner than the stoichiometric air-fuel ratio. The air-fuel ratio control unit is configured to, during the rich process, execute a lean pulse process for controlling, over a period shorter than a period of one execution of the lean process, the air-fuel ratio of the exhaust gas flowing into the exhaust gas control catalyst to reach a lean air-fuel ratio having a higher lean level than the air-fuel ratio during the lean process.

In the air-fuel ratio control apparatus for the internal combustion engine according to the first aspect of the present disclosure, the air-fuel ratio control unit may be configured to set at least one of an execution timing of the lean pulse process, an execution period of the lean pulse process, and a lean level of the exhaust gas flowing into the exhaust gas control catalyst in the lean pulse process based on a value of a deposition parameter related to a deposition amount of a carbon-containing substance on an oxygen storage agent supported by the exhaust gas control catalyst.

In the air-fuel ratio control apparatus for the internal combustion engine configured as described above, the air-fuel ratio control unit may be configured to execute the lean pulse process when the value of the deposition parameter is a value indicating that the deposition amount of the carbon-containing substance on the oxygen storage agent is equal to or larger than a predetermined reference deposition amount.

In the air-fuel ratio control apparatus for the internal combustion engine configured as described above, the execution period of the lean pulse process and the lean level in the lean pulse process may be fixed values set to remove all the carbon-containing substance in the reference deposition amount from the oxygen storage agent.

In the air-fuel ratio control apparatus for the internal combustion engine configured as described above, the air-fuel ratio control unit may be configured to periodically execute the lean pulse process in a predetermined cycle.

In the air-fuel ratio control apparatus for the internal combustion engine configured as described above, the air-fuel ratio control unit may be configured to set at least one of the execution period of the lean pulse process and the lean level in the lean pulse process based on the value of the deposition parameter when the lean pulse process is executed.

The air-fuel ratio control apparatus for the internal combustion engine configured as described above may further include a deposition amount calculation unit configured to calculate the value of the deposition parameter. The deposition amount calculation unit may be configured to calculate the value of the deposition parameter in proportion to an integrated value of excess reducing agents flowing into the exhaust gas control catalyst when a temperature of the exhaust gas control catalyst is equal to or higher than a predetermined reference temperature and an oxygen storage amount of the exhaust gas control catalyst is zero.

In the air-fuel ratio control apparatus for the internal combustion engine configured as described above, the deposition amount calculation unit may be configured to, when fuel cut control is executed to temporarily stop supply of fuel to the internal combustion engine during operation of the internal combustion engine, reset the value of the deposition parameter to a value indicating that the deposition amount of the carbon-containing substance on the oxygen storage agent is zero.

The air-fuel ratio control apparatus for the internal combustion engine according to the first aspect of the present disclosure may further include a storage amount estimation unit configured to estimate an oxygen storage amount of the exhaust gas control catalyst. The air-fuel ratio control unit may be configured to make switching from the lean process to the rich process before the oxygen storage amount estimated by the storage amount estimation unit reaches a maximum oxygen storage amount.

In the air-fuel ratio control apparatus for the internal combustion engine according to the first aspect of the present disclosure, the air-fuel ratio control unit may be configured to execute the lean pulse process when an oxygen storage amount of the exhaust gas control catalyst is zero.

In the air-fuel ratio control apparatus for the internal combustion engine according to the first aspect of the present disclosure, the air-fuel ratio control unit may be configured to execute the lean pulse process when a temperature of the exhaust gas control catalyst is a temperature at which a carbon-containing substance is deposited on an oxygen storage agent supported by the exhaust gas control catalyst.

A second aspect of the present disclosure relates to an air-fuel ratio control method for an internal combustion engine including an exhaust gas control catalyst provided in an exhaust passage of the internal combustion engine and having an oxygen storage capacity. The air-fuel ratio control method includes: (i) alternately repeating a rich process for controlling an air-fuel ratio of exhaust gas flowing into the exhaust gas control catalyst to reach a rich air-fuel ratio that is richer than a stoichiometric air-fuel ratio and a lean process for controlling the air-fuel ratio of the exhaust gas flowing into the exhaust gas control catalyst to reach a lean air-fuel ratio that is leaner than the stoichiometric air-fuel ratio; and (ii) during the rich process, executing a lean pulse process for controlling, over a period shorter than a period of one execution of the lean process, the air-fuel ratio of the exhaust gas flowing into the exhaust gas control catalyst to reach a lean air-fuel ratio having a higher lean level than the air-fuel ratio during the lean process.

With the air-fuel ratio control apparatus for the internal combustion engine and the air-fuel ratio control method for the internal combustion engine according to the present disclosure, it is possible to suppress the decrease in the oxygen storage capacity of the oxygen storage agent while suppressing the decrease in the fuel efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
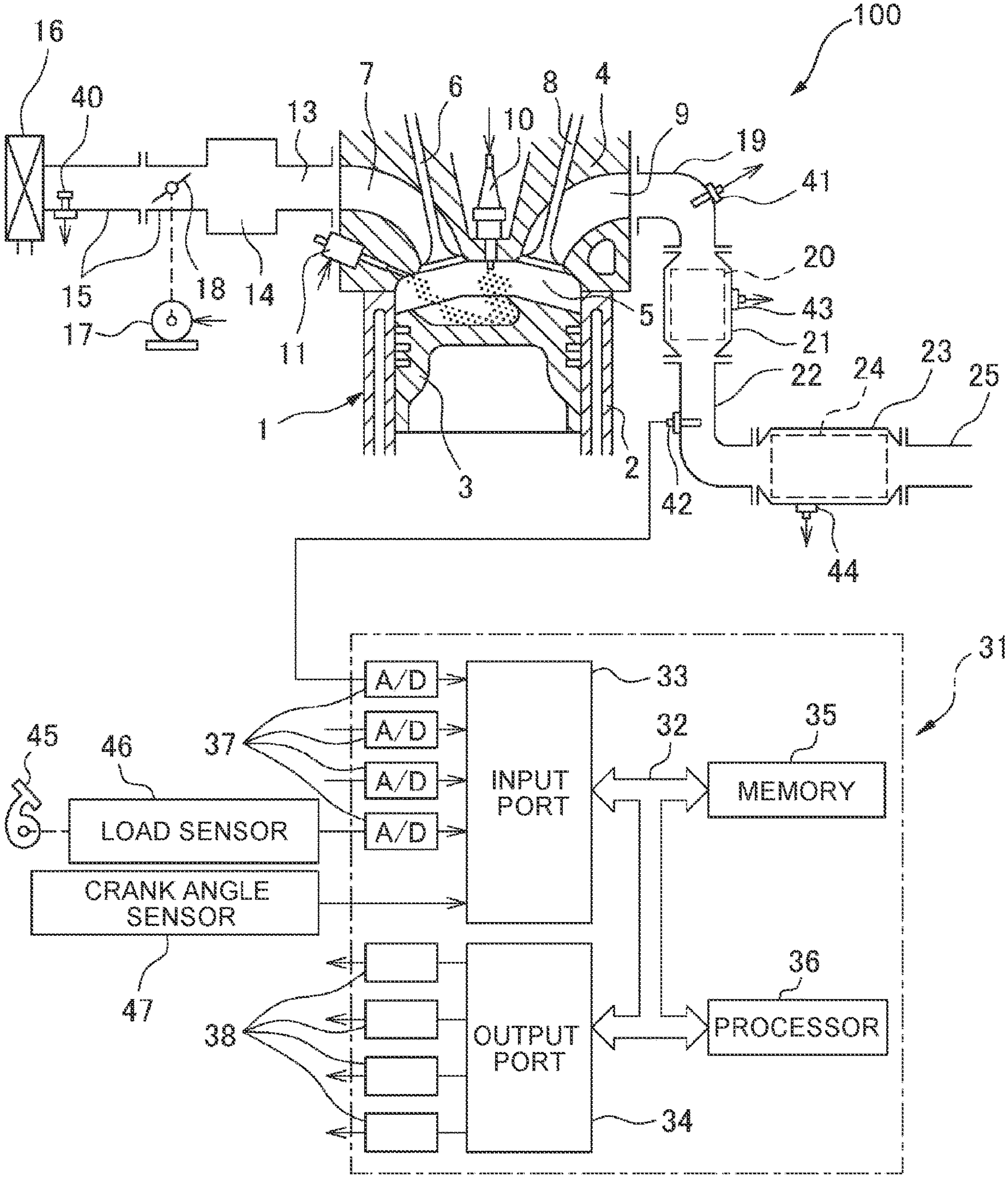
FIG. 1 schematically shows an internal combustion engine using an air-fuel ratio control apparatus according to an exemplary embodiment of the present disclosure.

An embodiment will be described in detail with reference to the drawings. In the following description, like constituent elements are denoted by like reference numerals.

Prior to description of an air-fuel ratio control apparatus for an internal combustion engine according to the present disclosure, the overall internal combustion engine will first be described below. FIG. 1 schematically shows an internal combustion engine 100 using the air-fuel ratio control apparatus according to the exemplary embodiment of the present disclosure. As shown in FIG. 1, an engine body 1 of the internal combustion engine 100 includes a cylinder block 2, pistons 3 that reciprocate in the cylinder block 2, a cylinder head 4 fixed above the cylinder block 2, and combustion chambers 5 formed between the pistons 3 and the cylinder head 4. In the present embodiment, the cylinder block 2 has a plurality of cylinders, and one piston 3 reciprocates in each cylinder. The cylinder head 4 has intake ports 7. Each intake port 7 is opened and closed by an intake valve 6. Similarly, the cylinder head 4 has exhaust ports 9. Each exhaust port 9 is opened and closed by an exhaust valve 8.

As shown in FIG. 1, spark plugs 10 are disposed at central portions of the inner wall surface of the cylinder head 4, and fuel injection valves 11 are disposed at peripheral portions of the inner wall surface of the cylinder head 4. The spark plug 10 generates a spark in response to an ignition signal. The fuel injection valve 11 injects a predetermined amount of fuel into the combustion chamber 5 in response to an injection signal. The fuel injection valve 11 may be disposed to inject fuel into the intake port 7. In the present embodiment, gasoline with a stoichiometric air-fuel ratio of 14.6 is used as the fuel. The internal combustion engine may use fuels other than gasoline or fuels mixed with gasoline.

The internal combustion engine 100 includes a surge tank 14 coupled to the intake port 7 of each cylinder via a corresponding intake branch pipe 13, an intake pipe 15 coupled to the surge tank 14, and an air cleaner 16 coupled to the intake pipe 15. The intake port 7, the intake branch pipe 13, the surge tank 14, and the intake pipe 15 constitute an intake passage. A throttle valve 18 driven by a throttle valve drive actuator 17 is disposed in the intake pipe 15. The throttle valve 18 is turned by the throttle valve drive actuator 17 to change the opening area of the intake passage.

The internal combustion engine 100 includes an exhaust manifold 19 coupled to the exhaust port 9 of each cylinder, an upstream casing 21 coupled to the exhaust manifold 19 and including an upstream exhaust gas control catalyst (hereinafter referred to as "upstream catalyst") 20, a first exhaust pipe 22 coupled to the upstream casing 21, a downstream casing 23 coupled to the first exhaust pipe 22 and including a downstream exhaust gas control catalyst (hereinafter referred to as "downstream catalyst") 24, and a second exhaust pipe 25 coupled to the downstream casing 23. The second exhaust pipe 25 communicates with an atmosphere via, for example, a muffler (not shown). The exhaust port 9, the exhaust manifold 19, the upstream casing 21, the first exhaust pipe 22, the downstream casing 23, and the second exhaust pipe 25 constitute an exhaust passage. In the present embodiment, two exhaust gas control catalysts that are the upstream catalyst 20 and the downstream catalyst 24 are provided in the exhaust system, but only one exhaust gas control catalyst or three or more exhaust gas control catalysts may be provided in the exhaust system.

The internal combustion engine 100 includes an electronic control unit (ECU) 31. The ECU 31 includes an input port 33, an output port 34, a memory 35, and a processor 36 interconnected via a bi-directional bus 32.

The input port 33 is connected to various sensors. An airflow meter 40 is disposed in the intake pipe 15 to detect the flow rate of air flowing through the intake pipe 15. The airflow meter 40 is connected to the input port 33 via a corresponding analog-to-digital (A/D) converter 37, and an output from the airflow meter 40 is input to the input port 33.

An upstream air-fuel ratio sensor 41 is disposed in the exhaust manifold 19 to detect the air-fuel ratio of exhaust gas flowing through the exhaust manifold 19 (that is, exhaust gas flowing into the upstream catalyst 20). A downstream air-fuel ratio sensor 42 is disposed in the first exhaust pipe 22 to detect the air-fuel ratio of exhaust gas flowing through the first exhaust pipe 22 (that is, exhaust gas flowing out of the upstream catalyst 20 and flowing into the downstream catalyst 24). The air-fuel ratio sensors 41, 42 are connected to the input port 33 via corresponding A/D converters 37, and outputs from the air-fuel ratio sensors 41, 42 are input to the input port 33.

In the present embodiment, limiting-current air-fuel ratio sensors are used as the air-fuel ratio sensors 41, 42. Therefore, the air-fuel ratio sensors 41, 42 are configured such that the output currents from the air-fuel ratio sensors 41, 42 increase as the air-fuel ratios of exhaust gas around the air-fuel ratio sensors 41, 42 increase (that is, become leaner). Therefore, the air-fuel ratio corresponding to the output value from the upstream air-fuel ratio sensor 41 (hereinafter referred to as "output air-fuel ratio") represents the air-fuel ratio of exhaust gas flowing into the upstream catalyst 20. The output air-fuel ratio from the downstream air-fuel ratio sensor 42 represents the air-fuel ratio of exhaust gas flowing into the downstream catalyst 24.

Although the limiting-current air-fuel ratio sensors are used as the air-fuel ratio sensors 41, 42 in the present embodiment, air-fuel ratio sensors other than the limiting-current air-fuel ratio sensors may be used as long as the outputs change depending on the air-fuel ratios of exhaust gas. Examples of such air-fuel ratio sensors include an oxygen sensor whose output sharply changes in the vicinity of the stoichiometric air-fuel ratio without application of voltage between electrodes constituting the sensor.

An upstream temperature sensor 43 is disposed on the upstream catalyst 20 to detect the temperature of the upstream catalyst 20. A downstream temperature sensor 44 is disposed on the downstream catalyst 24 to detect the temperature of the downstream catalyst 24. The temperature sensors 43, 44 are connected to the input port 33 via corresponding A/D converters 37, and outputs from the temperature sensors 43, 44 are input to the input port 33.

A load sensor 46 is connected to an accelerator pedal 45 to generate an output voltage proportional to the amount of depression of the accelerator pedal 45. The load sensor 46 is connected to the input port 33 via a corresponding A/D converter 37, and an output from the load sensor 46 is input to the input port 33. A crank angle sensor 47 generates an output pulse each time a crankshaft rotates by, for example, 15°. The crank angle sensor 47 is connected to the input port 33, and the output pulse from the crank angle sensor 47 is input to the input port 33. The processor 36 calculates an engine speed based on the output pulse from the crank angle sensor 47.

The output port 34 is connected to various actuators. Specifically, the output port 34 is connected to, for example, the spark plugs 10, the fuel injection valves 11, and the throttle valve drive actuator 17 via corresponding drive circuits 38, and operations of these actuators are controlled based on drive signals output from the output port 34.

The memory 35 includes, for example, a volatile semiconductor memory (e.g., a random-access memory (RAM)) and a non-volatile semiconductor memory (e.g., a read only memory (ROM)). The memory 35 stores, for example, computer programs for executing various processes by the processor 36, and various types of data to be used when various processes are executed by the processor 36.

The processor 36 includes one or more central processing units (CPUs) and peripheral circuits thereof. The processor 36 may further include an arithmetic circuit such as a logical operation unit or a numerical operation unit. The processor 36 executes various processes based on the computer programs stored in the memory 35.

Figure 2:
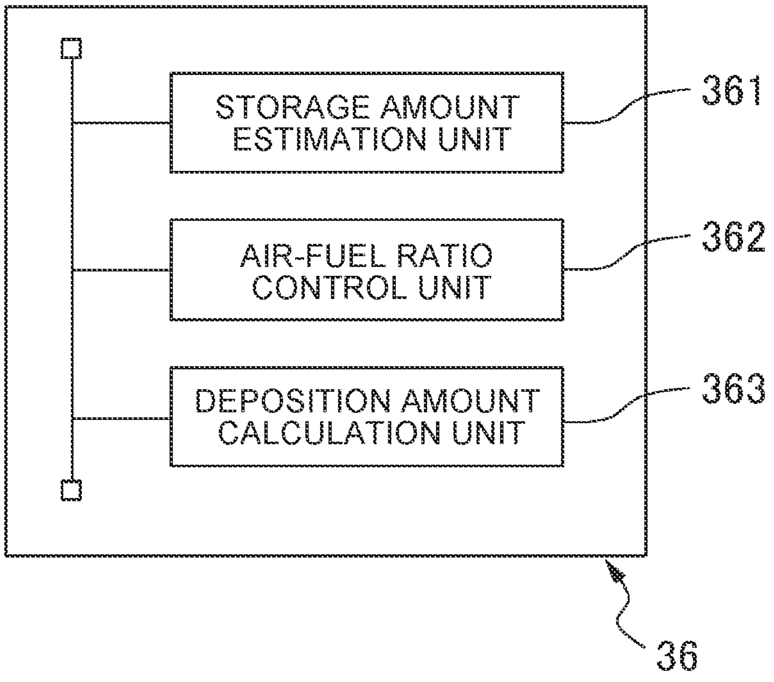
FIG. 2 is a functional block diagram of a processor of an electronic control unit.

FIG. 2 is a functional block diagram of the processor 36. As shown in FIG. 2, the processor 36 includes a storage amount estimation unit 361 that estimates the oxygen storage amount of an oxygen storage agent of the upstream catalyst 20 or the downstream catalyst 24, an air-fuel ratio control unit 362 that controls the air-fuel ratio of exhaust gas flowing into the upstream catalyst 20, and a deposition amount calculation unit 363 that calculates the deposition amount of a carbon-containing substance on the oxygen storage agent of the upstream catalyst 20 or the downstream catalyst 24. Each of these units of the processor 36 is, for example, a functional module implemented by a computer program that operates on the processor 36. Alternatively, each of these units of the processor 36 may be a dedicated arithmetic circuit provided in the processor 36. Details of each of these functional blocks will be described later.

The processor 36 controls the opening degree of the throttle valve 18 based on a load detected by the load sensor 46 (transmits a control signal to the throttle valve drive actuator 17 via the drive circuit 38) to control the amount of air to be supplied to the combustion chamber 5. The processor 36 controls the amount of fuel injection from the fuel injection valve 11 so that the air-fuel ratio of exhaust gas reaches a target air-fuel ratio (transmits a control signal to the fuel injection valve 11 via the drive circuit 38). Therefore, the electronic control unit (ECU) 31 including the processor 36 functions as an air-fuel ratio control apparatus that controls the air-fuel ratios of exhaust gas flowing into the exhaust gas control catalysts. This ECU 31 is an example of the "air-fuel ratio control apparatus" of the present disclosure.

Next, the configurations of the exhaust gas control catalysts will be described below. The exhaust gas control catalysts (upstream catalyst 20 and downstream catalyst 24) are catalysts each having an oxygen storage capacity, in particular, three-way catalysts in the present embodiment. Specifically, the exhaust gas control catalysts 20, 24 are three-way catalysts each obtained such that a support made of a ceramic supports a catalytic precious metal (e.g., platinum (Pt)) having a catalytic action and an oxygen storage agent (e.g., ceria ($CeO_2$)) having an oxygen storage capacity. The three-way catalyst has a function of simultaneously controlling unburned HC, CO, and NOx when the air-fuel ratio of exhaust gas flowing into the three-way catalyst is maintained at the stoichiometric air-fuel ratio. When a certain amount of oxygen is stored in the oxygen storage agent of the exhaust gas control catalyst 20, 24, unburned HC, CO, and NOx are simultaneously controlled even if the air-fuel ratio of exhaust gas flowing into the exhaust gas control catalyst 20, 24 slightly deviates to a richer or leaner side with respect to the stoichiometric air-fuel ratio.

That is, when the oxygen storage agent of the exhaust gas control catalyst 20, 24 can store oxygen, that is, when the oxygen storage amount of the exhaust gas control catalyst 20, 24 is smaller than the maximum storable oxygen amount, excess oxygen contained in the exhaust gas is stored in the exhaust gas control catalyst 20, 24 when the air-fuel ratio of the exhaust gas flowing into the exhaust gas control catalyst 20, 24 is slightly leaner than the stoichiometric air-fuel ratio. When ceria is used as the oxygen storage agent, a reaction expressed by Formula (1) occurs. A cerium ion at this time has a valence of 4.

$$CeO_{2-x}+x/2O_2\rightarrow CeO_2 \quad (1)$$

Since oxygen is stored by the oxygen storage agent of the exhaust gas control catalyst 20, 24 in this manner, the surface of the exhaust gas control catalyst 20, 24 is maintained at the stoichiometric air-fuel ratio. As a result, unburned HC, CO, and NOx are simultaneously controlled on the surface of the exhaust gas control catalyst 20, 24, and the air-fuel ratio of the exhaust gas flowing out of the exhaust gas control catalyst 20, 24 at this time is the stoichiometric air-fuel ratio.

When the exhaust gas control catalyst 20, 24 can release oxygen, that is, when the oxygen storage amount of the exhaust gas control catalyst 20, 24 is larger than zero, oxygen insufficient to reduce unburned HC and CO contained in the exhaust gas is released from the exhaust gas control catalyst 20, 24 when the air-fuel ratio of the exhaust gas flowing into the exhaust gas control catalyst 20, 24 is slightly richer than the stoichiometric air-fuel ratio. When ceria is used as the oxygen storage agent, a reaction expressed by Formula (2) occurs. The cerium ion at this time has a valence of 3.

$$CeO_2\rightarrow CeO_{2-x}+x/2O_2 \quad (2)$$

Since oxygen is released from the oxygen storage agent of the exhaust gas control catalyst 20, 24 in this manner, the surface of the exhaust gas control catalyst 20, 24 is maintained at the stoichiometric air-fuel ratio. As a result, unburned HC, CO, and NOx are simultaneously controlled on the surface of the exhaust gas control catalyst 20, 24, and the air-fuel ratio of the exhaust gas flowing out of the exhaust gas control catalyst 20, 24 at this time is the stoichiometric air-fuel ratio.

More strictly, ceria is reduced by a reducing species such as hydrogen to change from $CeO_2$ to $CeO_{2-x}$. Therefore, oxygen in ceria reacts with the reducing species such as hydrogen to change to $H_2O$ or the like, rather than being released from ceria. To facilitate understanding of description, it is herein assumed that oxygen is released from ceria in accordance with Formula (2).

When a certain amount of oxygen is stored in the exhaust gas control catalyst 20, 24, unburned HC, CO, and NOx are simultaneously controlled and the air-fuel ratio of the exhaust gas flowing out of the exhaust gas control catalyst 20, 24 is the stoichiometric air-fuel ratio even if the air-fuel ratio of the exhaust gas flowing into the exhaust gas control catalyst 20, 24 slightly deviates to a richer or leaner side with respect to the stoichiometric air-fuel ratio.

Next, basic air-fuel ratio control in the air-fuel ratio control apparatus of the present disclosure will be described below. Basic air-fuel ratio control to be executed in the air-fuel ratio control apparatus according to the present embodiment will schematically be described. In the air-fuel ratio control of the present embodiment, feedback control is executed to control the amount of fuel injection from the fuel injection valve 11 so that the output air-fuel ratio from the upstream air-fuel ratio sensor 41 reaches a target air-fuel ratio.

Figure 3:
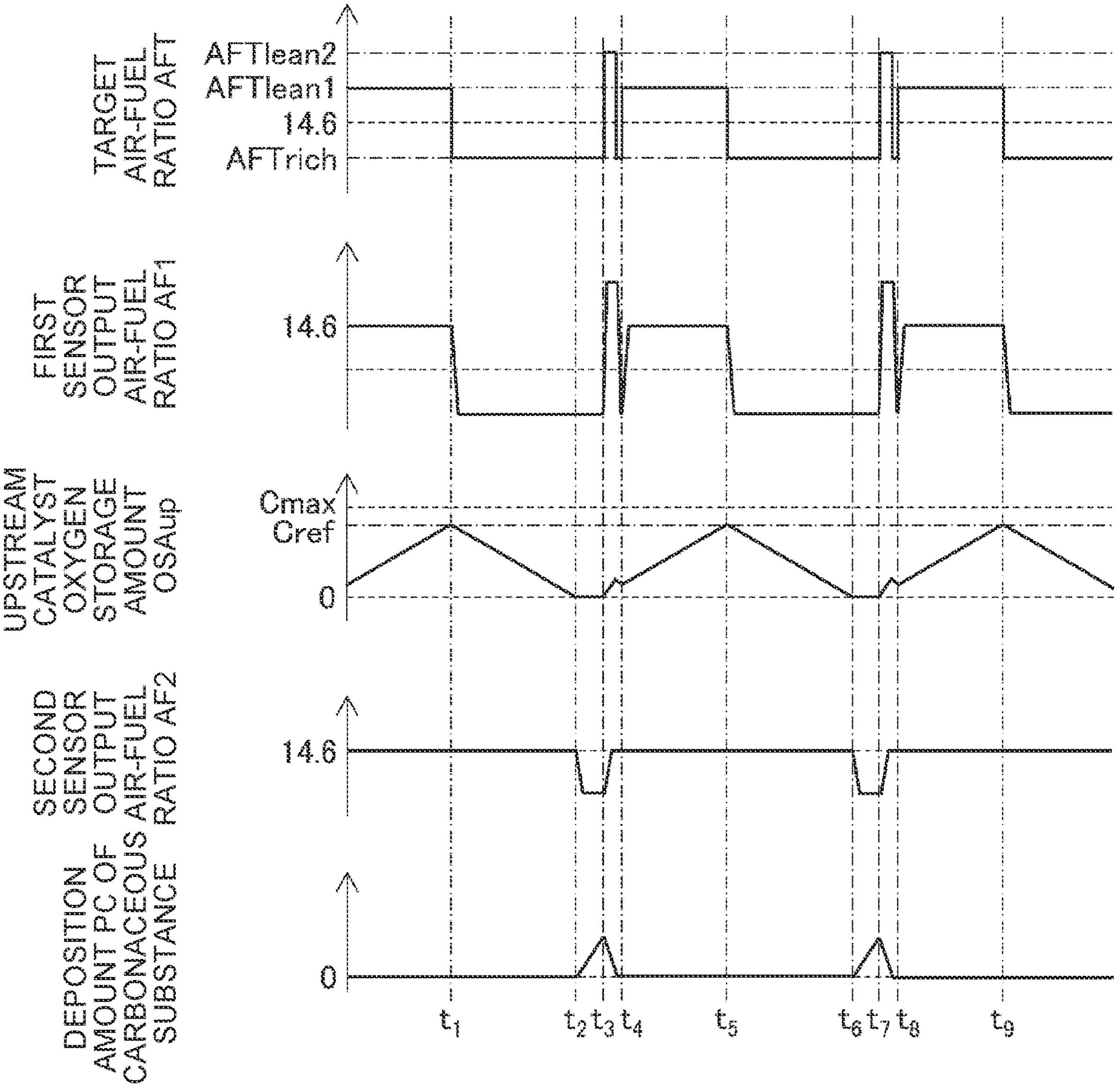
FIG. 3 is a time chart of a target air-fuel ratio and the like when the air-fuel ratio control apparatus executes air-fuel ratio control.

In the basic air-fuel ratio control of the present embodiment, the target air-fuel ratio is set based on, for example, the output air-fuel ratio from the downstream air-fuel ratio sensor 42. A target air-fuel ratio setting process in the basic air-fuel ratio control will be described below with reference to FIG. 3. FIG. 3 is a time chart of a target air-fuel ratio AFT, an output air-fuel ratio AF1 from the upstream air-fuel ratio sensor 41, an oxygen storage amount OSAup of the upstream catalyst 20, an output air-fuel ratio AF2 from the downstream air-fuel ratio sensor 42, and a deposition amount PC of a carbonaceous substance when the air-fuel ratio control according to the present embodiment is executed.

In the example shown in FIG. 3, a lean process is executed before time $t_1$ to control the target air-fuel ratio AFT of exhaust gas discharged from the engine body 1 to reach an air-fuel ratio leaner than the stoichiometric air-fuel ratio (hereinafter referred to as "lean air-fuel ratio"). As a result, the air-fuel ratio of the exhaust gas discharged from the engine body 1 and flowing into the upstream catalyst 20 is controlled to be the lean air-fuel ratio. Particularly in the lean process of the present embodiment, the target air-fuel ratio AFT is set to a first lean set air-fuel ratio AFTlean1 that is a predetermined air-fuel ratio (e.g., about 14.65 to 15.5) slightly leaner than the stoichiometric air-fuel ratio.

When the air-fuel ratio of the exhaust gas flowing into the upstream catalyst 20 is the lean air-fuel ratio through the lean process, the oxygen storage amount OSAup of the upstream catalyst 20 gradually increases. The oxygen storage amount OSAup of the upstream catalyst 20 is calculated by the storage amount estimation unit 361 of the processor 36 of the ECU 31.

In the present embodiment, the storage amount estimation unit 361 calculates the oxygen storage amount OSAup of the upstream catalyst 20 based on the amount of oxygen excessive or insufficient when the air-fuel ratio of the exhaust gas flowing into the upstream catalyst 20 is set to the stoichiometric air-fuel ratio (that is, the amount of an excess reducing agent (unburned HC, CO, etc.)). When oxygen is excessive in the exhaust gas flowing into the upstream catalyst 20, the storage amount estimation unit 361 calculates the oxygen storage amount under the assumption that the upstream catalyst 20 stores oxygen corresponding to the excess oxygen amount. When oxygen is insufficient in the exhaust gas flowing into the upstream catalyst 20 (when the reducing agent is excessive), the storage amount estimation unit 361 calculates the oxygen storage amount under the assumption that the upstream catalyst 20 releases oxygen corresponding to the insufficient oxygen amount.

Specifically, the storage amount estimation unit 361 calculates an amount OSR of oxygen stored in or released from the upstream catalyst 20 (hereinafter referred to as "oxygen storage/release amount") based on, for example, the output air-fuel ratio AF1 from the upstream air-fuel ratio sensor 41 and an estimated value of the intake amount in the combustion chamber 5 calculated based on the output from the airflow meter 40 or a fuel supply amount of the fuel injection valve 11. The storage amount estimation unit 361 calculates the oxygen storage/release amount OSR of the upstream catalyst 20 based on, for example, Formula (3).

$$OSR=0.23\times Qi\times(AF1-AFR) \quad (3)$$

In Formula (3), 0.23 represents an oxygen concentration in the air, Qi represents a fuel injection amount, AF1 represents the output air-fuel ratio from the upstream air-fuel ratio sensor 41, and AFR represents the stoichiometric air-fuel ratio.

The storage amount estimation unit 361 estimates the oxygen storage amount OSAup of the upstream catalyst 20 by integrating the calculated oxygen storage/release amount OSR. When the calculated oxygen storage amount OSAup of the upstream catalyst 20 is a negative value, the oxygen storage amount OSAup is maintained at zero.

In the present embodiment, when the calculated oxygen storage amount OSAup of the upstream catalyst 20 reaches a predetermined switching reference value Cref (time $t_1$, $t_5$, $t_9$), a rich process is started to control the target air-fuel ratio AFT of the exhaust gas discharged from the engine body to reach an air-fuel ratio richer than the stoichiometric air-fuel ratio (hereinafter referred to as "rich air-fuel ratio"). As a result, the air-fuel ratio of the exhaust gas discharged from the engine body 1 and flowing into the upstream catalyst 20 is controlled to be the rich air-fuel ratio. Particularly in the rich process of the present embodiment, the target air-fuel ratio AFT is set to a rich set air-fuel ratio AFTrich that is a predetermined air-fuel ratio (e.g., about 13.4 to 14.55) slightly richer than the stoichiometric air-fuel ratio. The switching reference value Cref is set to an amount smaller than a maximum storable oxygen amount Cmax that is the maximum value of the amount of oxygen storable in the upstream catalyst 20. Therefore, in the present embodiment, the air-fuel ratio control unit 362 makes switching from the lean process to the rich process before the oxygen storage amount of the upstream catalyst 20 estimated by the storage amount estimation unit 361 reaches the vicinity of the maximum storable oxygen amount Cmax. Thus, in the present embodiment, the rich process is started before the oxygen storage amount of the upstream catalyst 20 reaches the vicinity of the maximum storable oxygen amount Cmax and oxygen and NOx flow out of the upstream catalyst 20.

When the air-fuel ratio of the exhaust gas flowing into the upstream catalyst 20 is the rich air-fuel ratio through the rich process, the oxygen storage amount OSAup of the upstream catalyst 20 gradually decreases and eventually reaches zero (time $t_2$, $t_6$). When the oxygen storage amount OSAup of the upstream catalyst 20 reaches zero, unburned HC and CO in the exhaust gas are not controlled by the upstream catalyst 20 and therefore the exhaust gas at the rich air-fuel ratio flows out of the upstream catalyst 20. As a result, the output air-fuel ratio from the downstream air-fuel ratio sensor 42 changes to the rich air-fuel ratio after times $t_2$, $t_6$.

In the present embodiment, a lean pulse process is executed at predetermined timings (times $t_3$, $t_7$) after the oxygen storage amount OSAup of the upstream catalyst 20 reaches zero. Details of the lean pulse process will be described later.

After the lean pulse process is finished, the rich process is started to control the target air-fuel ratio AFT to reach the rich air-fuel ratio (times $t_4$, $t_8$). Then, the lean process is started again and then the same operation is repeated. Thus, in the basic air-fuel ratio control of the present embodiment, the rich process and the lean process are alternately repeated. In other words, in the air-fuel ratio control of the present embodiment, the air-fuel ratio of the exhaust gas discharged from the engine body 1 is basically switched alternately between the rich air-fuel ratio and the lean air-fuel ratio.

Through the basic air-fuel ratio control of the present embodiment, unburned HC, CO, and the like temporarily flow out of the upstream catalyst 20 at times $t_2$ to $t_4$ and $t_6$ to $t_8$, but NOx basically does not flow out of the upstream catalyst 20. The unburned HC and CO that have flowed out of the upstream catalyst 20 are controlled by the downstream catalyst 24. The oxygen storage amount of the downstream catalyst 24 increases to the maximum storable oxygen amount Cmax during fuel cut control in which the internal combustion engine 100 is operated without supplying fuel, and then decreases when controlling unburned HC and CO that have flowed out of the upstream catalyst 20.

Next, the lean pulse process will be described below. When the basic air-fuel ratio control (control that does not include the lean pulse process) is executed to alternately repeat the lean process and the rich process as described above, the overall average air-fuel ratio is slightly the rich air-fuel ratio. This is because the rich process is continued even though the oxygen storage amount of the upstream catalyst 20 reaches almost zero at time $t_2$ or $t_6$.

Experiments conducted by the inventors have shown that, when the overall average air-fuel ratio is slightly the rich air-fuel ratio, unburned HC contained in the exhaust gas at the rich air-fuel ratio is dehydrogenated on ceria that is the oxygen storage agent and is deposited on ceria as carbon or a carbon-containing substance containing carbon, such as hydrocarbon (hereinafter referred to as "carbonaceous substance"). More specifically, the carbonaceous substance is deposited on the oxygen storage agent when the temperature of the exhaust gas control catalyst 20, 24 is 450° ° C. to 650°

C. and the amount of oxygen is small in the exhaust gas flowing through the exhaust gas control catalyst 20, 24.

Even if the carbonaceous substance is deposited on ceria, the deposited carbonaceous substance is removed by executing fuel cut control in which the internal combustion engine 100 is operated without supplying fuel. When the fuel cut control is executed, air supplied to the combustion chamber 5 is discharged from the combustion chamber 5 as it is. Therefore, the air flows into the exhaust gas control catalyst 20, 24. Since the oxygen concentration of the air is much higher than that of the exhaust gas, the carbonaceous substance is removed by reaction with oxygen in the air when the temperature of the exhaust gas control catalyst 20, 24 is high, though the oxidizability (reactivity) of the deposited carbonaceous substance is not very high.

When the internal combustion engine 100 is in steady operation (e.g., when a vehicle including the internal combustion engine 100 is in high-speed steady traveling), the fuel cut control is not executed for a long period. When the fuel cut control is not executed for a long period, the carbonaceous substance deposited on the oxygen storage agent of the exhaust gas control catalyst 20, 24 is not removed and the amount of the carbonaceous substance gradually increases.

Figure 4A:
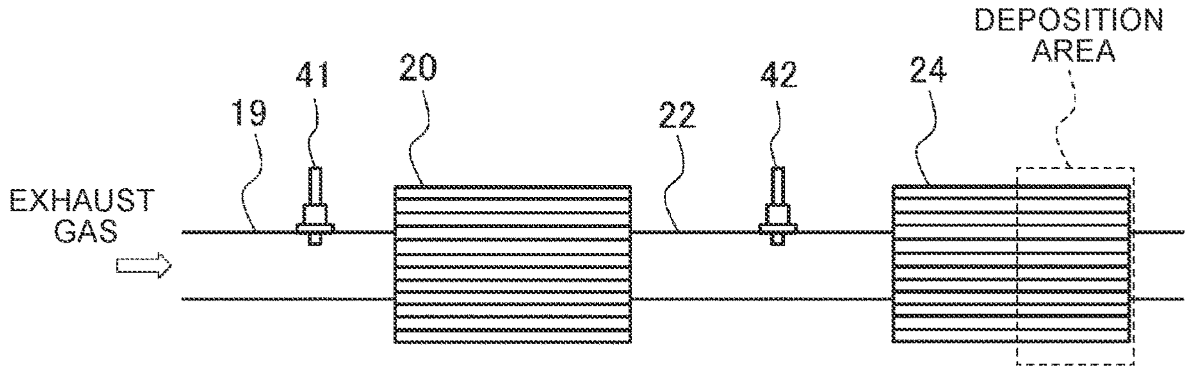
FIG. 4A schematically shows how a carbonaceous substance is deposited on each exhaust gas control catalyst of the air-fuel ratio control apparatus.
Figure 4B:
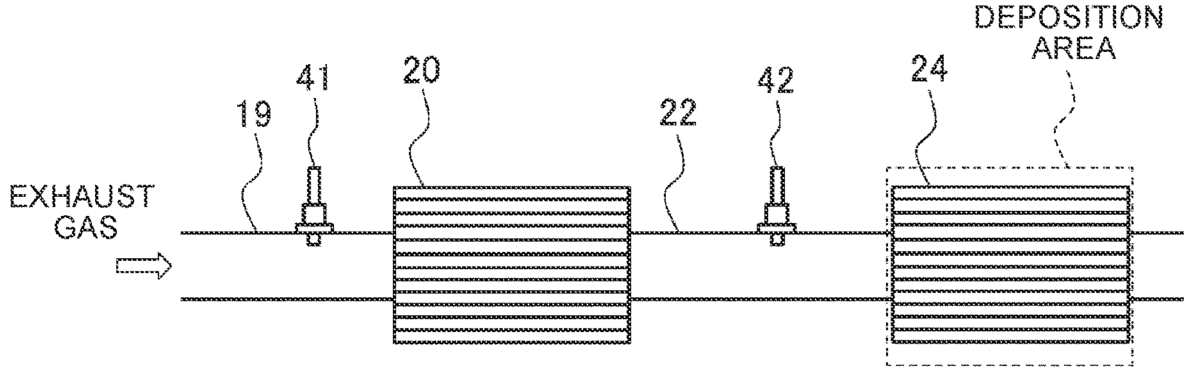
FIG. 4B schematically shows how the carbonaceous substance is deposited on each exhaust gas control catalyst of the air-fuel ratio control apparatus.
Figure 4C:
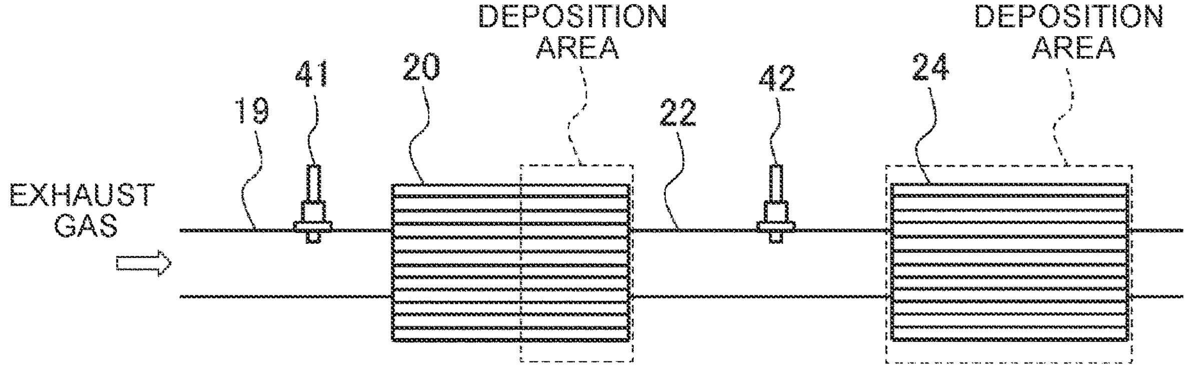
FIG. 4C schematically shows how the carbonaceous substance is deposited on each exhaust gas control catalyst of the air-fuel ratio control apparatus.

The carbonaceous substance is deposited sequentially from the downstream side of the exhaust gas control catalysts 20, 24. FIGS. 4A to 4C schematically show how the carbonaceous substance is deposited on each of the exhaust gas control catalysts 20, 24. As shown in FIG. 4A, when the carbonaceous substance is gradually deposited after the fuel cut control, the carbonaceous substance is first deposited on a latter part of the downstream catalyst 24. When the basic air-fuel ratio control is executed without executing the fuel cut control, the carbonaceous substance is deposited on the entire downstream catalyst 24 as shown in FIG. 4B, and is deposited on a latter part of the upstream catalyst 20. The reason why the carbonaceous substance is deposited sequentially from the downstream side of the exhaust gas control catalysts 20, 24 is that oxygen contained in the exhaust gas is consumed on the upstream side and does not reach the downstream side.

Figure 5A:
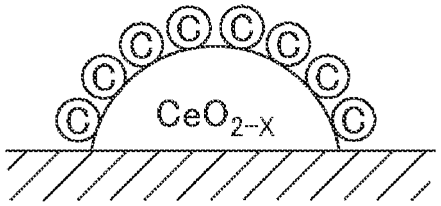
FIG. 5A schematically shows a state around an oxygen storage agent of the exhaust gas control catalyst when ceria is used as the oxygen storage agent.
Figure 5B:
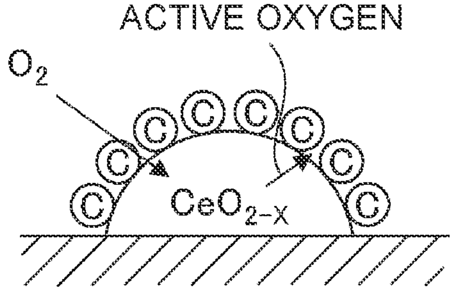
FIG. 5B schematically shows a state around the oxygen storage agent of the exhaust gas control catalyst when ceria is used as the oxygen storage agent.
Figure 5C:
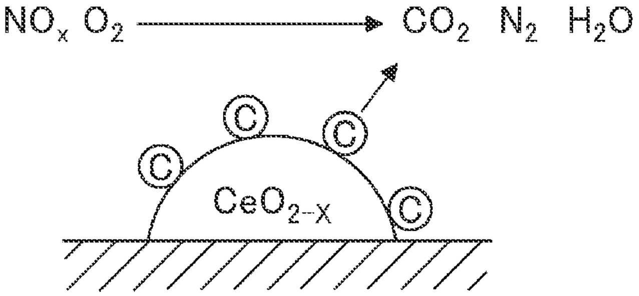
FIG. 5C schematically shows a state around the oxygen storage agent of the exhaust gas control catalyst when ceria is used as the oxygen storage agent.

FIGS. 5A to 5C schematically show states around the oxygen storage agent when ceria is used as the oxygen storage agent. FIG. 5A shows a state in which the exhaust gas flowing into the exhaust gas control catalyst 20, 24 has the rich air-fuel ratio and the carbonaceous substance is deposited on ceria that is the oxygen storage agent. When the carbonaceous substance is deposited on ceria, ceria can no longer store oxygen, and thus the oxygen storage capacity of the oxygen storage agent decreases. In the state shown in FIG. 4A, the downstream catalyst 24 cannot store or release oxygen at its latter part. In the state shown in FIG. 4C, the entire downstream catalyst 24 cannot store or release oxygen and the upstream catalyst 20 cannot store or release oxygen at its latter part. As a result, the oxygen storage capacity of the exhaust system including both the exhaust gas control catalysts 20, 24 is low in the state shown in FIG. 4C.

When exhaust gas at the lean air-fuel ratio to a relatively high lean level temporarily flows into the exhaust gas control catalyst 20, 24 and oxygen is supplied to ceria in a state in which the exhaust gas at the rich air-fuel ratio continues to flow into the exhaust gas control catalyst 20, 24, that is, in a state in which the cerium ion has the valence of 3, active oxygen is released from ceria as shown in FIG. 5B. The released active oxygen is adsorbed on the carbonaceous substance deposited on ceria, thereby increasing the oxidizability (reactivity) of the carbonaceous substance. Particularly in the carbonaceous substance having a double bond of carbon, active oxygen causes a defect in the double bond. As a result, the oxidizability (reactivity) of the carbonaceous substance increases. When the oxidizability of the carbonaceous substance increases, the carbonaceous substance reduces NOx in the exhaust gas flowing into the exhaust gas control catalyst 20, 24 to control NOx as shown in FIG. 5C. Along with this, the carbonaceous substance deposited on ceria is removed. That is, it is possible to remove the carbonaceous substance deposited on ceria while controlling NOx in the exhaust gas.

Therefore, in the present embodiment, the lean pulse process is executed as shown in FIG. 3 when the rich process is being executed and the oxygen storage amount OSAup of the upstream catalyst 20 is zero. In the present embodiment, the lean pulse process is executed once during each rich process period as shown in FIG. 3. In the lean pulse process, the target air-fuel ratio AFT is controlled to reach a predetermined constant second lean set air-fuel ratio AFTlean2 (e.g., about 15.0 to 25.0) having a higher lean level than the air-fuel ratio during the lean process. As a result, the air-fuel ratio of the exhaust gas discharged from the engine body 1 and flowing into the upstream catalyst 20 has a higher lean level than the air-fuel ratio during the lean process. In the lean pulse process, the fuel supply may be stopped temporarily. Therefore, the target air-fuel ratio AFT in the lean pulse process may be a very high value.

The lean pulse process is executed over a period shorter than the period of one lean process (e.g., times $t_4$ to $t_5$). For example, the lean pulse process is executed over a period in which combustion in the combustion chamber 5 is executed any number of times from once to several tens of times. Particularly in the present embodiment, the execution period of the lean pulse process is set based on the deposition amount PC of the carbonaceous substance when the lean pulse process is started. Specifically, the execution period of the lean pulse process is set longer as the deposition amount of the carbonaceous substance increases. In the present embodiment, as a result of setting the execution period of the lean pulse process, the excess oxygen amount and the insufficient oxygen amount in the exhaust gas flowing into the upstream catalyst 20 are equal to each other and the overall average air-fuel ratio in the upstream catalyst 20 is approximately the stoichiometric air-fuel ratio in one rich-lean cycle including one rich process and one lean process (cycle in which the oxygen storage amount OSAup changes from the switching reference value Cref and reaches the switching reference value Cref again via zero; cycle of times $t_1$ to $t_5$ in FIG. 3).

The deposition amount PC of the carbonaceous substance is calculated by the deposition amount calculation unit 363 of the processor 36 of the ECU 31. As described above, the carbonaceous substance is deposited when the temperature of the exhaust gas control catalyst 20, 24 is 450° C. to 650° C. and the amount of oxygen is small in the exhaust gas flowing through the exhaust gas control catalyst 20, 24. Therefore, in the present embodiment, when the temperature of the upstream catalyst 20 detected by the upstream temperature sensor 43 and the temperature of the downstream catalyst 24 detected by the downstream temperature sensor 44 are equal to or higher than a first reference temperature (e.g., 450° C.) and equal to or lower than a second reference temperature (e.g., 650° C.) and the oxygen storage amount of the upstream catalyst 20 estimated by the storage amount estimation unit 361 is zero, the deposition amount calculation unit 363 calculates the deposition amounts of the carbonaceous substances on the exhaust gas control catalysts

20, 24 by integrating the insufficient oxygen amount (that is, the amount of the excess reducing agent) in the exhaust gas flowing into the upstream catalyst 20. In the present embodiment, the temperatures of both the exhaust gas control catalysts 20, 24 are detected by the temperature sensors 43, 44. The temperatures of the exhaust gas control catalysts 20, 24 increase when the engine load continues to be high as in a case where the vehicle including the internal combustion engine 100 is in steady traveling on an expressway. Therefore, the temperatures of the exhaust gas control catalysts 20, 24 may be estimated based on the output from the load sensor 46 or the like.

Even if the temperature of the upstream catalyst 20 is equal to or higher than the first reference temperature and equal to or lower than the second reference temperature and the oxygen storage amount of the upstream catalyst 20 is zero, all the reducing agent that flows into the upstream catalyst 20 is not deposited on the upstream catalyst 20. Therefore, the deposition amount calculation unit 363 may calculate, as the deposition amount of the carbonaceous substance, a value obtained by multiplying an integrated value of the insufficient oxygen amount (that is, the amount of the excess reducing agent) in the exhaust gas flowing into the upstream catalyst 20 by a predetermined coefficient of smaller than 1. Thus, the deposition amount calculation unit 363 may calculate the deposition amount of the carbonaceous substance in proportion to the integrated value of the insufficient oxygen amount (that is, the amount of the excess reducing agent) in the exhaust gas flowing into the upstream catalyst 20.

As described above, the deposited carbonaceous substance is removed when the fuel cut control is executed. Therefore, the deposition amount calculation unit 363 resets the calculated deposition amount of the carbonaceous substance to zero when the fuel cut control is executed.

The lean pulse process is set based on the deposition amount PC of the carbonaceous substance when the lean pulse process is started. Therefore, the lean pulse process is executed when the carbonaceous substance is deposited. As a result, in the present embodiment, the lean pulse process is executed under the conditions that the carbonaceous substance is deposited, for example, the temperatures of the exhaust gas control catalysts 20, 24 are temperatures that cause deposition of the carbonaceous substance (e.g., about 450° C. to 650° C.) and the amount of oxygen is small in the exhaust gas flowing through the exhaust gas control catalysts 20, 24.

As described above, in the present embodiment, the lean pulse process is executed to remove the carbonaceous substances deposited on the oxygen storage agents of the exhaust gas control catalysts 20, 24 as shown in FIGS. 5B and 5C. Therefore, it is possible to suppress the decrease in the oxygen storage capacities of the oxygen storage agents. In addition, NOx in the exhaust gas can be controlled through the reduction by the removed carbonaceous substances. Therefore, it is possible to reduce the amount of unburned HC and the like required to control NOx through the reduction, thereby reducing the amount of fuel required to control NOx through the reduction and therefore suppressing a decrease in fuel efficiency. According to the present embodiment, it is possible to suppress the decrease in the oxygen storage capacities of the oxygen storage agents and therefore suppress exacerbation of emission while suppressing the decrease in the fuel efficiency.

In the present embodiment, the overall average air-fuel ratio in the upstream catalyst 20 can approximate the stoichiometric air-fuel ratio. As a result, it is possible to reduce components such as unburned HC, $NH_3$, and $N_2O$ in the exhaust gas flowing out of the exhaust system including both the exhaust gas control catalysts 20, 24.

Figure 6:
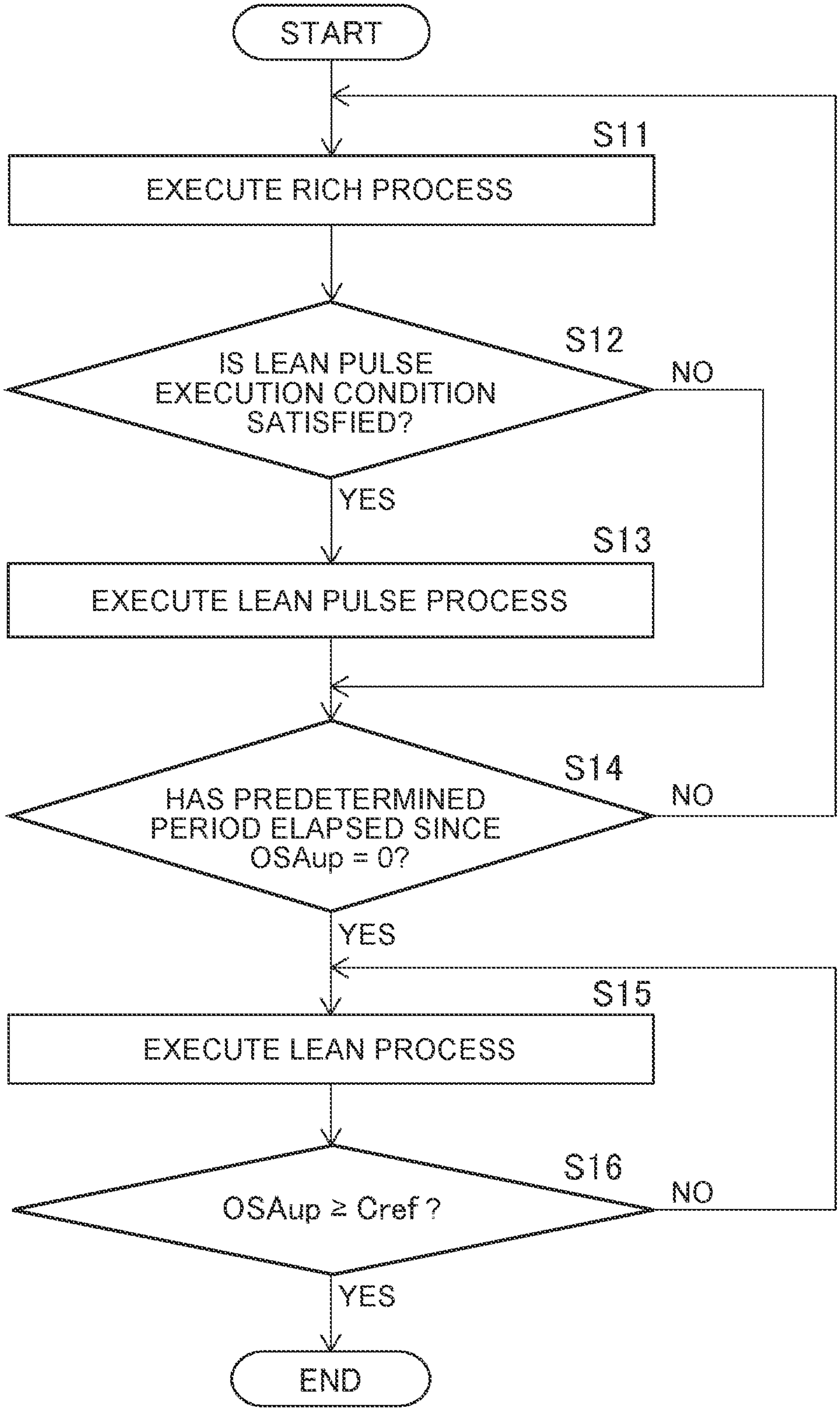
FIG. 6 is a flowchart schematically showing a flow of air-fuel ratio control to be executed by an air-fuel ratio control unit of the air-fuel ratio control apparatus.

Next, a flowchart showing a flow of the air-fuel ratio control will be described below. FIG. 6 is a flowchart schematically showing the flow of the air-fuel ratio control to be executed by the air-fuel ratio control unit 362. In particular, FIG. 6 shows the flow of the air-fuel ratio control in one rich-lean cycle including one rich process and one lean process. Therefore, the air-fuel ratio control shown in FIG. 6 is started, for example, when the lean process in the previous rich-lean cycle is finished or when the fuel cut control is finished.

As shown in FIG. 6, the air-fuel ratio control unit 362 first executes the rich process (step S11). Therefore, the air-fuel ratio control unit 362 sets the target air-fuel ratio AFT to the rich set air-fuel ratio AFTrich. At this time, the storage amount estimation unit 361 estimates the oxygen storage amount of the upstream catalyst 20 based on, for example, the output air-fuel ratio from the upstream air-fuel ratio sensor 41 and the amount of fuel injection from the fuel injection valve 11. When the oxygen storage amount estimated by the storage amount estimation unit 361 reaches zero, the deposition amount calculation unit 363 calculates the deposition amount of the carbonaceous substance based on, for example, the temperature of the upstream catalyst 20 detected by the upstream temperature sensor 43 and the output air-fuel ratio from the upstream air-fuel ratio sensor 41.

The air-fuel ratio control unit 362 determines whether the condition for executing the lean pulse process is satisfied during the execution of the rich process (step S12). In the present embodiment, the condition for executing the lean pulse process is satisfied when a predetermined first period (or a predetermined first number of combustion cycles of the internal combustion engine 100) has elapsed since the oxygen storage amount estimated by the storage amount estimation unit 361 reached zero.

When determination is made in step S12 that the condition for executing the lean pulse process is satisfied, the air-fuel ratio control unit 362 executes the lean pulse process (step S13). In the present embodiment, the air-fuel ratio control unit 362 sets the target air-fuel ratio AFT to the second lean set air-fuel ratio AFTlean2 having a higher lean level than the first lean set air-fuel ratio AFTlean1 during the lean process over a predetermined execution period. The air-fuel ratio control unit 362 sets the execution period of the lean pulse process based on the deposition amount of the carbonaceous substance calculated by the deposition amount calculation unit 363. When the lean pulse process is finished, the air-fuel ratio control unit 362 starts the rich process again.

Then, the air-fuel ratio control unit 362 determines whether a predetermined second period (or a predetermined second number of combustion cycles of the internal combustion engine 100) has elapsed since the oxygen storage amount estimated by the storage amount estimation unit 361 reached zero (step S14). When determination is made in step S14 that the predetermined second period has not elapsed, steps S11 to S13 are repeated.

When determination is made in step S14 that the predetermined second period has elapsed, the air-fuel ratio control unit 362 executes the lean process (step S15). Therefore, the air-fuel ratio control unit 362 sets the target air-fuel ratio AFT to the first lean set air-fuel ratio AFTlean1. The air-fuel ratio control unit 362 determines whether the oxygen storage amount OSAup estimated by the storage amount estimation unit 361 is equal to or larger than the switching reference value Cref during the execution of the lean process (step S16). When determination is made in step S16 that the oxygen storage amount OSAup is smaller than the switching reference value Cref, step S15 is repeated and the execution of the lean process is maintained. When determination is made in step S16 that the oxygen storage amount OSAup is equal to or larger than the switching reference value Cref, one rich-lean cycle in the air-fuel ratio control is completed, and the operation is started again from step S11.

Next, modifications of the embodiment will be described below. In the above embodiment, the deposition amount calculation unit 363 calculates the deposition amounts of the carbonaceous substances on the exhaust gas control catalysts 20, 24. Instead of the deposition amount of the carbonaceous substance, the deposition amount calculation unit 363 may calculate a value of another deposition parameter that changes depending on the deposition amount of the carbonaceous substance. For example, the deposition amount of the carbonaceous substance is proportional to a value obtained by multiplying the flow rate of the exhaust gas when the oxygen storage amount of the exhaust gas control catalyst 20, 24 is zero by a value obtained by subtracting an equivalence ratio from one. Therefore, the deposition amount calculation unit 363 may calculate the value of such a parameter as the deposition parameter representing the deposition amount of the carbonaceous substance. Also in this case, the deposition amount calculation unit resets the value of the deposition parameter to a value indicating that the deposition amount of the carbonaceous substance on the oxygen storage agent is zero when the fuel cut control is executed.

In the above embodiment, the air-fuel ratio control unit 362 executes the lean pulse process for each rich process. The air-fuel ratio control unit 362 may execute one lean pulse process for a plurality of rich processes. That is, the air-fuel ratio control unit 362 may periodically execute the lean pulse process in a predetermined constant cycle (once every predetermined number of rich-lean cycles). In this case, the deposition amount calculation unit 363 calculates a current deposition amount of the carbonaceous substance by integrating the deposition amounts of the carbonaceous substance in the past rich processes. The deposition amount calculation unit 363 sets the execution period of the lean pulse process based on the calculated deposition amount of the carbonaceous substance (deposition amount when the lean pulse process is executed).

In the above embodiment, the deposition amount calculation unit 363 sets the execution period of the lean pulse process based on the deposition amount of the carbonaceous substance. The deposition amount calculation unit 363 may set the lean level of the target air-fuel ratio AFT during the lean pulse process based on the deposition amount of the carbonaceous substance instead of or in addition to the execution period of the lean pulse process. In this case, the deposition amount calculation unit 363 sets the lean level of the target air-fuel ratio AFT during the lean pulse process to increase as the deposition amount of the carbonaceous substance increases. Also in this case, the target air-fuel ratio in the lean pulse process is leaner than the first lean set air-fuel ratio AFTlean1 in the lean process. Therefore, the deposition amount calculation unit 363 sets at least one of the execution period of the lean pulse process and the lean level in the lean pulse process based on the deposition amount of the carbonaceous substance when the lean pulse process is executed.

In the above embodiment, the lean pulse process is periodically executed in the constant cycle, and the execution period of the lean pulse process or the lean level in the lean pulse process is set based on the deposition amount of the carbonaceous substance when the lean pulse process is executed. The execution period of the lean pulse process and the lean level in the lean pulse process may be set to fixed values, and the execution timing of the lean pulse process may be set based on the deposition amount of the carbonaceous substance.

Figure 7:
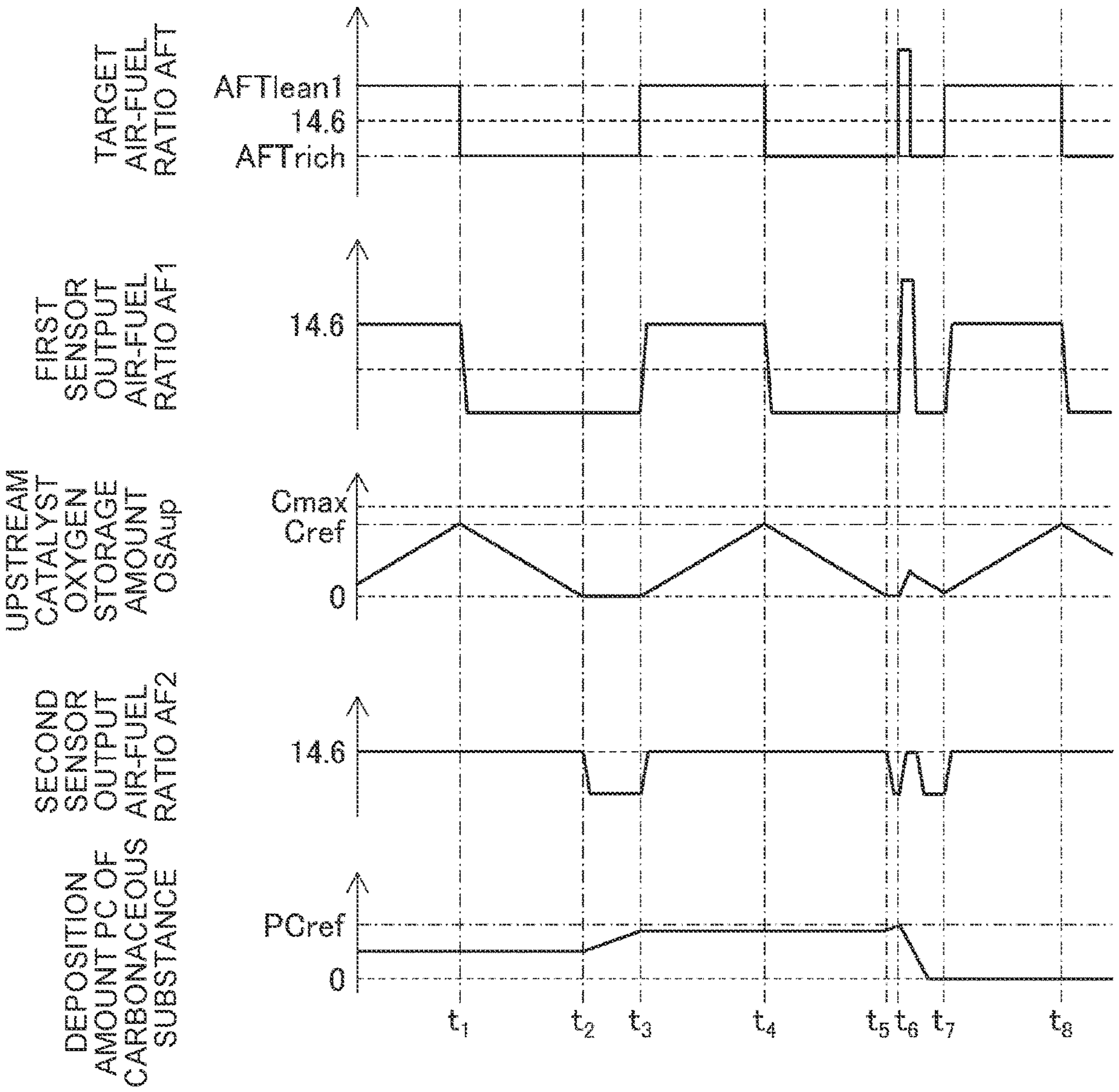
FIG. 7 is a time chart similar to FIG. 3, showing the target air-fuel ratio and the like when air-fuel ratio control according to a modification of the embodiment is executed.

FIG. 7 is a time chart similar to FIG. 3, showing the target air-fuel ratio AFT and the like when air-fuel ratio control according to one modification is executed.

In the example shown in FIG. 7 as well, the lean process is executed before time $t_1$ as in the example shown in FIG. 3. When the oxygen storage amount OSAup of the upstream catalyst 20 reaches the switching reference value Cref at time $t_1$, the rich process is started. At time $t_2$, the oxygen storage amount OSAup of the upstream catalyst 20 reaches zero, and the deposition amount of the carbonaceous substance on the upstream catalyst 20 gradually increases. At time $t_3$ when a certain length of time (operation cycle) has elapsed since the oxygen storage amount OSAup of the upstream catalyst 20 reached zero, the lean process is started again. In this manner, the basic air-fuel ratio control in which the rich process and the lean process are alternately repeated is executed also in the present modification.

As a result of such basic air-fuel ratio control, the deposition amount PC of the carbonaceous substance calculated by the deposition amount calculation unit 363 reaches a reference deposition amount PCref at time $t_6$. The reference deposition amount PCref is any predetermined constant deposition amount. For example, when the deposition amount is larger than the reference deposition amount PCref, the emission of exhaust gas flowing out of the exhaust system including the exhaust gas control catalysts 20, 24 increases abruptly.

Therefore, the lean pulse process is started when the deposition amount PC of the carbonaceous substance is equal to or larger than the reference deposition amount PCref at time $t_6$. In the present modification, the execution timing of the lean pulse process is set based on the deposition amount PC of the carbonaceous substance.

At this time, the execution period of the lean pulse process and the lean level in the lean pulse process are preset fixed values. Particularly in the present modification, the execution period of the lean pulse process and the lean level in the lean pulse process are set so that the carbonaceous substance in the reference deposition amount PCref can be removed from the upstream catalyst 20. In the present modification, the execution period of the lean pulse process and the lean level in the lean pulse process are preset fixed values, but may be changed based on, for example, the temperatures of the exhaust gas control catalysts 20, 24.

As described above, in the above embodiment and its modification, at least one of the execution timing of the lean pulse process, the execution period of the lean pulse process, and the lean level of the exhaust gas flowing into the exhaust gas control catalyst in the lean pulse process is set based on the deposition amount of the carbonaceous substance on the oxygen storage agent supported by the exhaust gas control catalyst 20, 24.

Next, verification of the effects of the embodiment and its modification will be described below. As described above, according to the above embodiment and its modification, the carbonaceous substances deposited on the oxygen storage agents can be removed. Therefore, it is possible to suppress the decrease in the oxygen storage capacities of the oxygen storage agents. In addition, NOx in the exhaust gas can be controlled through the reduction by the removed carbonaceous substances. Therefore, exacerbation of emission of the exhaust gas can be suppressed. The effect of suppressing the exacerbation of emission of the exhaust gas is compared with that in a case where air-fuel ratio control different from the air-fuel ratio control according to the present embodiment and its modification is executed.

Figure 8:
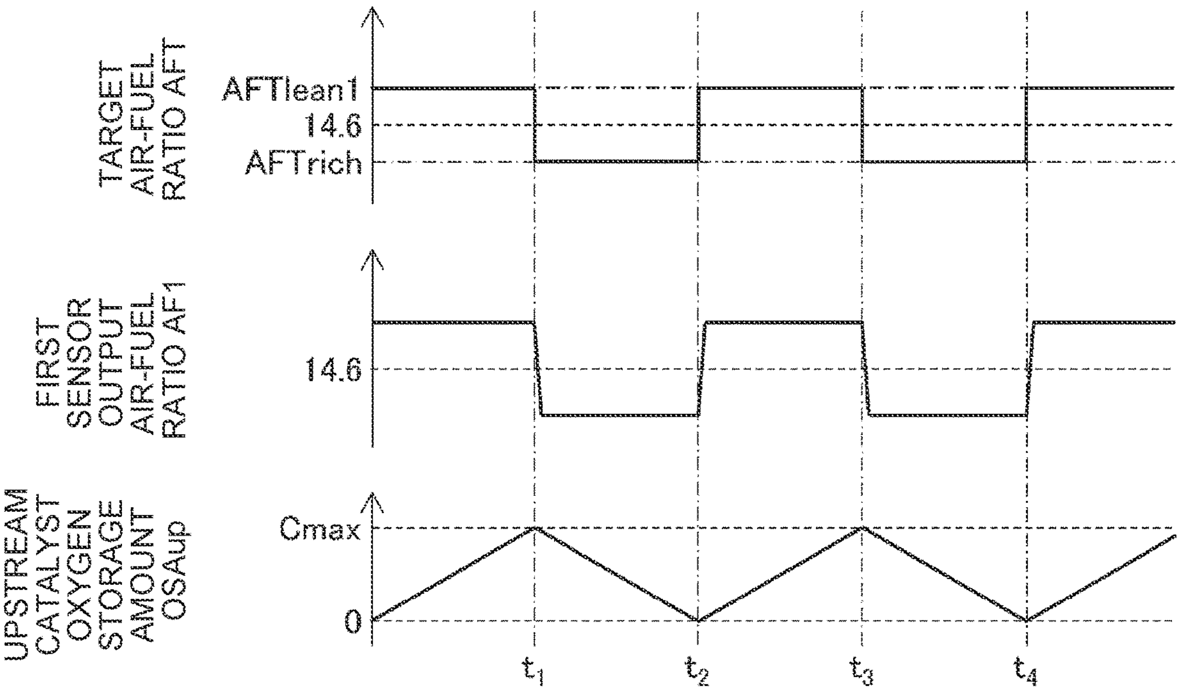
FIG. 8 is a time chart of the target air-fuel ratio and the like when air-fuel ratio control in the first comparative control is executed.

FIG. 8 is a time chart of the target air-fuel ratio AFT, the output air-fuel ratio AF1 from the upstream air-fuel ratio sensor 41, and the oxygen storage amount OSAup of the upstream catalyst 20 when air-fuel ratio control in the first comparative control is executed. In the first comparative control shown in FIG. 8, when the oxygen storage amount OSAup of the upstream catalyst 20 reaches the maximum storable oxygen amount Cmax (times $t_1$, $t_3$), the air-fuel ratio control is switched from the lean process to the rich process. In the first comparative control, when the oxygen storage amount OSAup of the upstream catalyst 20 reaches zero (times $t_2$, $t_4$), the air-fuel ratio control is switched from the rich process to the lean process. Therefore, in the first comparative control, the excess oxygen amount and the insufficient oxygen amount in the exhaust gas flowing into the upstream catalyst 20 are equal to each other and the overall average air-fuel ratio is the stoichiometric air-fuel ratio in one rich-lean cycle.

Figure 9:
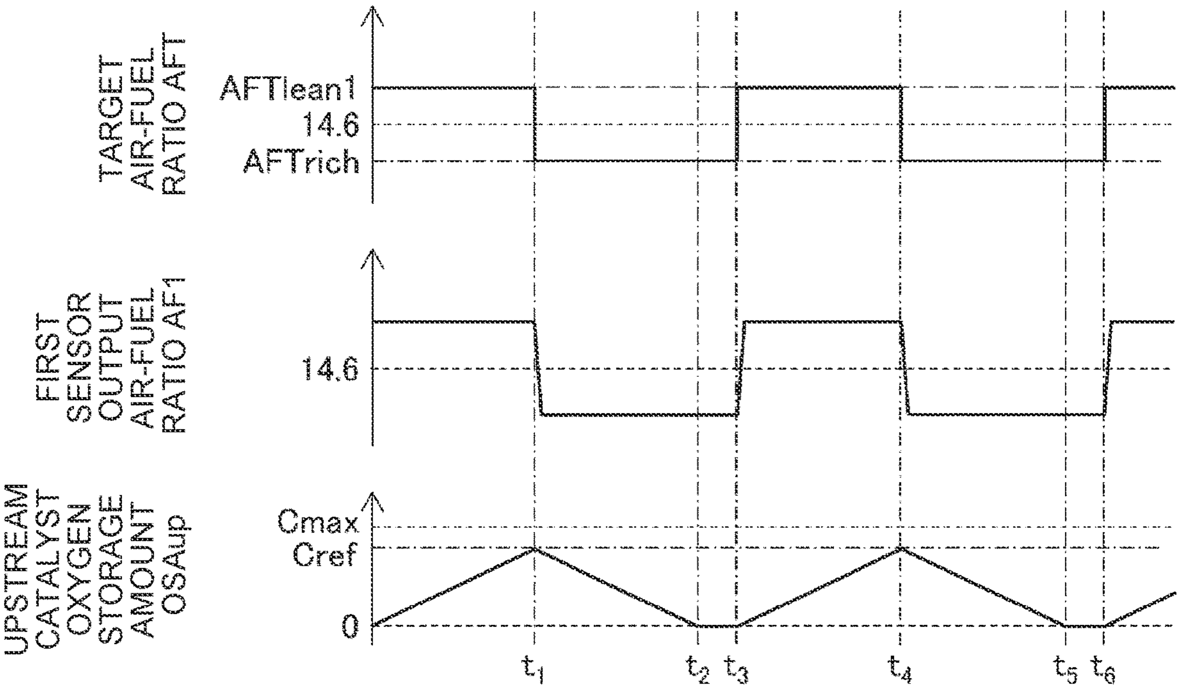
FIG. 9 is a time chart similar to FIG. 8, showing the target air-fuel ratio and the like when air-fuel ratio control in the second comparative control is executed.

FIG. 9 is a time chart similar to FIG. 8, showing the target air-fuel ratio AFT and the like when air-fuel ratio control in the second comparative control is executed. In the second comparative control shown in FIG. 9, when the oxygen storage amount OSAup of the upstream catalyst 20 reaches the switching reference value Cref smaller than the maximum storable oxygen amount Cmax (times $t_1$, $t_4$), the air-fuel ratio control is switched from the lean process to the rich process. In the second comparative control, when a predetermined period has elapsed (times $t_3$, $t_6$) since the oxygen storage amount OSAup of the upstream catalyst 20 reached zero (times $t_2$, $t_5$), the air-fuel ratio control is switched from the rich process to the lean process. Therefore, in the second comparative control, the excess oxygen amount in the exhaust gas flowing into the upstream catalyst 20 is smaller than the insufficient oxygen amount and the overall average air-fuel ratio is the rich air-fuel ratio in one rich-lean cycle.

Figure 10:
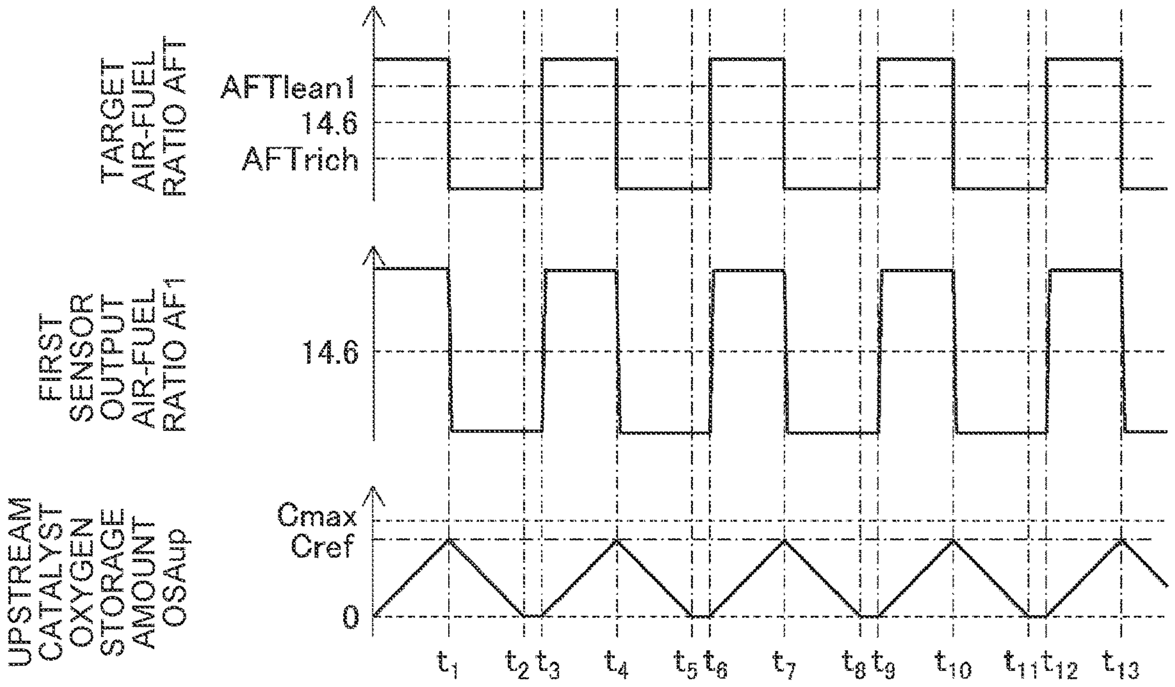
FIG. 10 is a time chart similar to FIG. 8, showing the target air-fuel ratio and the like when air-fuel ratio control in the third comparative control is executed.

FIG. 10 is a time chart similar to FIG. 8, showing the target air-fuel ratio AFT and the like when air-fuel ratio control in the third comparative control is executed. In the third comparative control shown in FIG. 10, when the oxygen storage amount OSAup of the upstream catalyst 20 reaches the switching reference value Cref (times $t_1$, $t_4$, $t_7$, $t_{10}$, $t_{13}$), the air-fuel ratio control is switched from the lean process to the rich process as in the second comparative control. In the third comparative control as well, when a predetermined period has elapsed (times $t_3$, $t_6$, $t_9$, $t_{12}$) since the oxygen storage amount OSAup of the upstream catalyst 20 reached zero, the air-fuel ratio control is switched from the rich process to the lean process. In the third comparative control, the target air-fuel ratio AFT in the lean process is set to an air-fuel ratio having a higher lean level than the first lean set air-fuel ratio, and the target air-fuel ratio AFT in the rich process is set to an air-fuel ratio having a higher rich level than the rich set air-fuel ratio.

Table 1 shows comparison of the flow rates of various components flowing out of the exhaust system including the exhaust gas control catalysts 20, 24 when the air-fuel ratio control according to the above embodiment (control shown in FIG. 3), the air-fuel ratio control according to the modification (control shown in FIG. 7), and the first to third comparative controls are executed. In Table 1, the first present control represents the air-fuel ratio control according to the above embodiment, and the second present control represents the air-fuel ratio control according to the modification. The flow rate of HC and the flow rate of NOx are represented by ratios under the assumption that the flow rates in the first comparative control are 1. A transient mode in the table is an operation mode including the fuel cut control, and a steady mode is an operation mode in which the internal combustion engine 100 is operated at a constant high speed without the fuel cut control.

TABLE 1

| | Transient mode | | Steady mode: 5 minutes later | |
|---|---|---|---|---|
| | HC | NO*x* | HC | NO*x* |
| First comparative control | 1 | 1 | 1 | 1 |
| Second comparative control | 1.05 | 0.55 | 1.30 | 1.45 |
| Third comparative control | 1.10 | 0.60 | 1.10 | 0.80 |
| First present control | 0.80 | 0.55 | 0.80 | 0.60 |
| Second present control | 0.80 | 0.45 | 0.80 | 0.50 |

As shown in Table 1, when the second and third comparative controls are executed, the amount of NOx emission in the transient mode can be reduced as compared with the case where the first comparative control is executed. When the second and third comparative controls are executed, the amount of NOx emission increases in the steady mode as compared with the transient mode. When the first and second present controls are executed, the amount of NOx emission can be reduced in the steady mode to the same extent as that in the transient mode. In the first and second present controls, the average air-fuel ratio is approximately the stoichiometric air-fuel ratio as a result. Therefore, the amount of HC emission can also be reduced.

Figure 11:
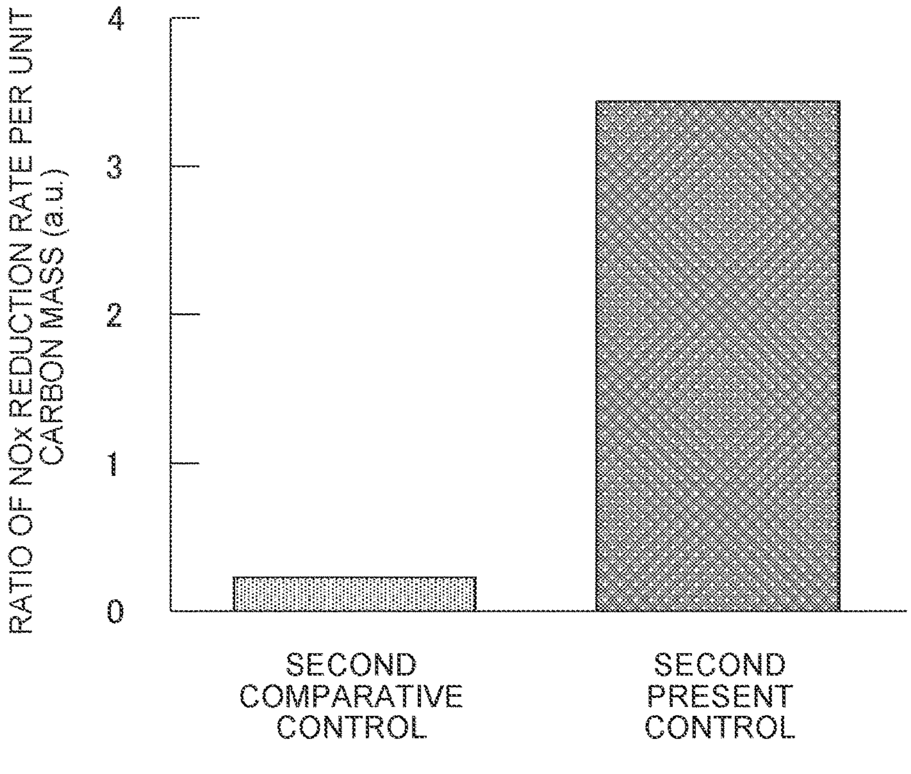
FIG. 11 shows a ratio of NOx reduction rates per unit deposition amount of the carbonaceous substance on ceria.

The NOx reduction rates per unit deposition amount of the carbonaceous substance are compared between the second comparative control and the second present control. FIG. 11 shows the ratio of the NOx reduction rates at 500° C. per unit deposition amount of the carbonaceous substance. FIG. 11 shows a case where the NOx reduction rate of the oxygen storage agent, that is, the NOx reduction rate when oxygen generated by dissociation of NO in a noble metal supported on the exhaust gas control catalyst is taken into the oxygen storage agent and the reduction of NOx occurs is 1. As shown in FIG. 11, the NOx reduction rate in the second present control is much higher than the NOx reduction rate in the second comparative control. As a result of the higher NOx reduction rate of the carbonaceous substance, the amount of NOx emission can be reduced even in the steady mode in the second present control as shown in Table 1.

Although the preferred embodiments of the present disclosure have been described above, the present disclosure is not limited to these embodiments, and various revisions and modifications may be made within the scope of the claims.

What is claimed is:

1. An air-fuel ratio control apparatus configured to control an air-fuel ratio of exhaust gas flowing into an exhaust gas control catalyst provided in an exhaust passage of an internal combustion engine and having an oxygen storage capacity, the air-fuel ratio control apparatus comprising a processor configured to control the air-fuel ratio of the exhaust gas flowing into the exhaust gas control catalyst, wherein:

the processor is configured to alternately repeat a rich process for controlling the air-fuel ratio of the exhaust gas flowing into the exhaust gas control catalyst to reach a rich air-fuel ratio that is richer than a stoichiometric air-fuel ratio and a lean process for controlling the air-fuel ratio of the exhaust gas flowing into the exhaust gas control catalyst to reach a lean air-fuel ratio that is leaner than the stoichiometric air-fuel ratio; and the processor is configured to, during the rich process, execute periodically, in a predetermined cycle, a lean pulse process for controlling, over a period shorter than a period of one execution of the lean process, the air-fuel ratio of the exhaust gas flowing into the exhaust gas control catalyst to reach a lean air-fuel ratio having a higher lean level than the air-fuel ratio during the lean process.

2. The air-fuel ratio control apparatus for the internal combustion engine according to claim 1, further comprising a deposition amount calculation unit configured to calculate a value of a deposition parameter related to a deposition amount of a carbon-containing substance on an oxygen storage agent supported by the exhaust gas control catalyst, and a storage amount estimation unit configured to estimate an oxygen storage amount of the exhaust gas control catalyst, wherein:

the engine includes a temperature sensor configured to detect a temperature of the exhaust gas control catalyst;

the deposition amount calculation unit is configured to calculate the value of the deposition parameter in proportion to an integrated value of excess reducing agents flowing into the exhaust gas control catalyst when the temperature of the exhaust gas control catalyst is equal to or higher than a predetermined reference temperature and the oxygen storage amount of the exhaust gas control catalyst is zero; and the processor is configured to set at least one of an execution timing of the lean pulse process, an execution period of the lean pulse process, and a lean level of the exhaust gas flowing into the exhaust gas control catalyst in the lean pulse process based on the value of the deposition parameter.

3. The air-fuel ratio control apparatus for the internal combustion engine according to claim 2, wherein the processor is configured to execute the lean pulse process when the value of the deposition parameter is a value indicating that the deposition amount of the carbon-containing substance on the oxygen storage agent is equal to or larger than a predetermined reference deposition amount.

4. The air-fuel ratio control apparatus for the internal combustion engine according to claim 3, wherein the execution period of the lean pulse process and the lean level in the lean pulse process are fixed values set to remove all the carbon-containing substance in the reference deposition amount from the oxygen storage agent.

5. The air-fuel ratio control apparatus for the internal combustion engine according to claim 2, wherein the processor is configured to set at least one of the execution period of the lean pulse process and the lean level in the lean pulse process based on the value of the deposition parameter when the lean pulse process is executed.

6. The air-fuel ratio control apparatus for the internal combustion engine according to claim 2, wherein the deposition amount calculation unit is configured to, when a fuel cut control is executed to temporarily stop supply of fuel to the internal combustion engine during operation of the internal combustion engine, reset the value of the deposition parameter to a value indicating that the deposition amount of the carbon-containing substance on the oxygen storage agent is zero.

7. The air-fuel ratio control apparatus for the internal combustion engine according to claim 2, wherein the processor is configured to execute switching from the lean process to the rich process before the oxygen storage amount estimated by the storage amount estimation unit reaches a maximum oxygen storage amount.

8. The air-fuel ratio control apparatus for the internal combustion engine according to claim 1, wherein the processor is configured to execute the lean pulse process when an oxygen storage amount of the exhaust gas control catalyst is zero.

9. The air-fuel ratio control apparatus for the internal combustion engine according to claim 1, wherein the processor is configured to execute the lean pulse process when a temperature of the exhaust gas control catalyst is a temperature at which a carbon-containing substance is deposited on an oxygen storage agent supported by the exhaust gas control catalyst.

10. An air-fuel ratio control method for an internal combustion engine, the internal combustion engine including an exhaust gas control catalyst provided in an exhaust passage of the internal combustion engine and having an oxygen storage capacity, the air-fuel ratio control method comprising:

alternately repeating a rich process for controlling an air-fuel ratio of exhaust gas flowing into the exhaust gas control catalyst to reach a rich air-fuel ratio that is richer than a stoichiometric air-fuel ratio and a lean process for controlling the air-fuel ratio of the exhaust gas flowing into the exhaust gas control catalyst to reach a lean air-fuel ratio that is leaner than the stoichiometric air-fuel ratio; and during the rich process, executing periodically, in a predetermined cycle, a lean pulse process for controlling, over a period shorter than a period of one execution of the lean process, the air-fuel ratio of the exhaust gas flowing into the exhaust gas control catalyst to reach a lean air-fuel ratio having a higher lean level than the air-fuel ratio during the lean process.

* * * * *